United States Patent
Herman

(10) Patent No.: US 9,721,385 B2
(45) Date of Patent: *Aug. 1, 2017

(54) GENERATION OF THREE-DIMENSIONAL IMAGERY FROM A TWO-DIMENSIONAL IMAGE USING A DEPTH MAP

(71) Applicant: DreamWorks Animation LLC, Glendale, CA (US)

(72) Inventor: Brad Kenneth Herman, Culver City, CA (US)

(73) Assignee: DreamWorks Animation LLC, Glendale, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/618,981

(22) Filed: Feb. 10, 2015

(65) Prior Publication Data

US 2016/0232710 A1    Aug. 11, 2016

(51) Int. Cl.
*G06T 17/20* (2006.01)
*G02B 27/01* (2006.01)
(Continued)

(52) U.S. Cl.
CPC .......... *G06T 17/20* (2013.01); *G02B 27/017* (2013.01); *G06T 9/001* (2013.01);
(Continued)

(58) Field of Classification Search
CPC ....... G06T 19/006; G06T 17/00; G06T 17/20; G06T 2207/10012; G06T 7/0051;
(Continued)

(56) References Cited

U.S. PATENT DOCUMENTS 5,287,437 A * 2/1994 Deering .................. G06T 15/10
                                                        345/419
5,812,269 A * 9/1998 Svetkoff ................ G01B 11/24
                                                        250/559.23
(Continued)

FOREIGN PATENT DOCUMENTS

EP    2568439 A2    3/2013
WO    94/16406 A1   7/1994
(Continued)

OTHER PUBLICATIONS

Felinto, Dalai Quintanilha, Aldo Rene Zang, and Luiz Velho. "Production framework for full panoramic scenes with photorealistic augmented reality." CLEI Electronic Journal 16.3 (2013): 8-8.*

(Continued)

*Primary Examiner* — Sultana M Zalalee
(74) *Attorney, Agent, or Firm* — Morrison & Foerster LLP

(57) ABSTRACT

A method for generating stereoscopic images includes obtaining image data comprising a plurality of sample points. A direction, a color value, and a depth value are associated with each sample point. The directions and depth values are relative to a common origin. A mesh is generated by displacing the sample points from the origin. The sample points are displaced in the associated directions by distances representative of the corresponding depth values. The image data is mapped to the mesh such that the color values associated with the sample points are mapped to the mesh at the corresponding directions. A first image of the mesh is generated from a first perspective, and a second image of the mesh is generated from a second perspective. The first and second images of the mesh may be caused to be displayed to provide an illusion of depth.

34 Claims, 10 Drawing Sheets

(51) Int. Cl.
  *H04N 13/00*  (2006.01)
  *H04N 13/02*  (2006.01)
  *H04N 13/04*  (2006.01)
  *G06T 9/00*   (2006.01)

(52) U.S. Cl.
  CPC ..... *H04N 13/0007* (2013.01); *H04N 13/0011* (2013.01); *H04N 13/025* (2013.01); *H04N 13/0275* (2013.01); *H04N 13/044* (2013.01)

(58) Field of Classification Search
  CPC ....... G06T 3/20; G06T 15/08; H04N 13/0271; H04N 13/0282; H04N 13/0011; H04N 13/026; H04N 13/0275; H04N 13/0429
  See application file for complete search history.

(56) References Cited

U.S. PATENT DOCUMENTS

| | | | |
|---|---|---|---|
| 2004/0032980 A1* | 2/2004 | Harman | G06T 7/0022 382/154 |
| 2004/0184655 A1* | 9/2004 | Ziegler | G06T 17/10 382/154 |
| 2005/0190180 A1* | 9/2005 | Jin | H04N 13/0018 345/419 |
| 2006/0036756 A1* | 2/2006 | Driemeyer | G06F 17/3089 709/231 |
| 2008/0135748 A1* | 6/2008 | Daimon | G01N 23/227 250/305 |
| 2008/0143709 A1* | 6/2008 | Fassero | G06T 3/00 345/419 |
| 2009/0100379 A1* | 4/2009 | Borchers | G09B 9/00 715/851 |
| 2010/0054579 A1* | 3/2010 | Okutomi | G01C 11/06 382/154 |
| 2010/0134486 A1* | 6/2010 | Colleen | G06T 17/05 345/419 |
| 2011/0074770 A1 | 3/2011 | Robinson et al. | |
| 2011/0109617 A1 | 5/2011 | Snook et al. | |
| 2011/0249122 A1 | 10/2011 | Tricoukes et al. | |
| 2011/0254841 A1* | 10/2011 | Lim | G06T 17/20 345/421 |
| 2012/0176409 A1 | 7/2012 | Noge | |
| 2012/0182403 A1 | 7/2012 | Lange | |
| 2012/0212509 A1 | 8/2012 | Benko et al. | |
| 2012/0320169 A1* | 12/2012 | Bathiche | G06F 3/011 348/53 |
| 2013/0050185 A1 | 2/2013 | Xie et al. | |
| 2013/0258062 A1 | 10/2013 | Noh et al. | |
| 2015/0312560 A1 | 10/2015 | Deering et al. | |

FOREIGN PATENT DOCUMENTS

| | | |
|---|---|---|
| WO | 98/09445 A1 | 3/1998 |
| WO | 03/034705 A2 | 4/2003 |
| WO | 2012/166593 A2 | 12/2012 |

OTHER PUBLICATIONS

Kim, Hansung, and Adrian Hilton. "3d scene reconstruction from multiple spherical stereo pairs." International journal of computer vision 104.1 (2013): 94-116.*

Oliveira, Manuel M., "Relaxed Cone Stepping for Relief Mapping", Fabio Policarpo Perpetual Entertainment, GPU Gems 3, Available at <http://http.developer.nvidia.com/GPUGems3/gpugems3_ch18.html>, Retrieved on Feb. 18, 2015, 19 pages.

Extended European Search Report (includes Partial European Search Report and Search Opinion) received for European Patent Application No. 16154613.0, mailed on May 17, 2016, 10 pages.

Extended European Search Report (includes Partial European Search Report and European Search Opinion) received for European Patent Application No. 16154616.3, mailed on Jun. 13, 2016, 10 pages.

Meine et al., "A New Sub-pixel Map for Image Analysis", Lecture Notes in Computer Science, vol. 4040, 2006, pp. 116-130.

Non-Final Office Action received for U.S. Appl. No. 14/618,990, mailed on Oct. 7, 2016, 34 pages.

Ainsworth et al., "Acquisition of Stereo Panoramas for Display in VR Environments", Proc. of SPIE—IS&T, vol. 7864, 2011, pp. 786416-1-786416-15.

Stenicke et al., "Interscopic User Interface Concepts for Fish Tank Virtual Reality Systems", IEEE Virtual Reality Conference, 2007, 8 pages.

\* cited by examiner

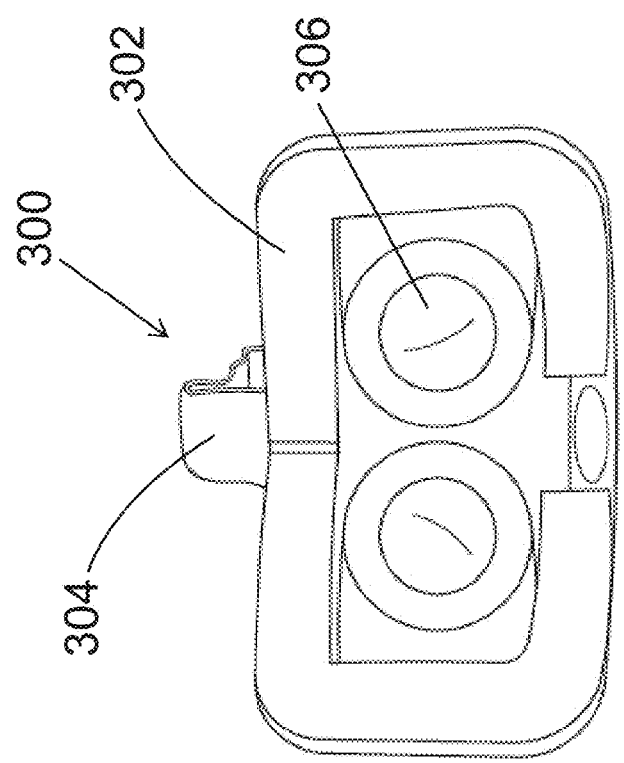
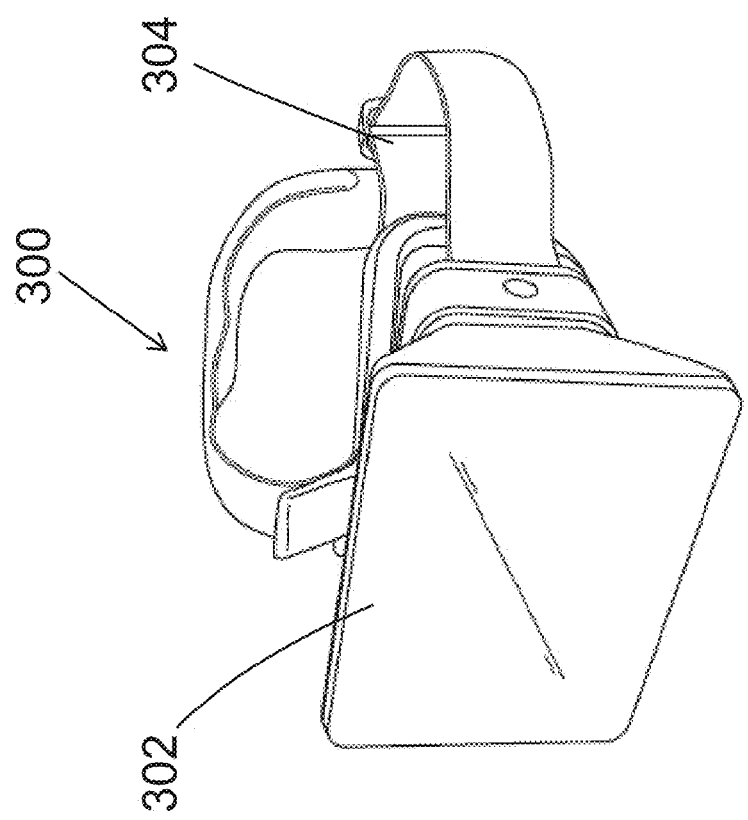
FIG. 3B
FIG. 3A

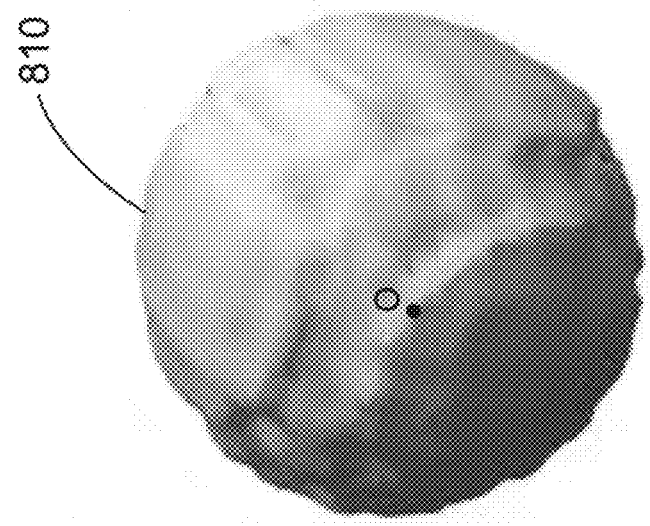
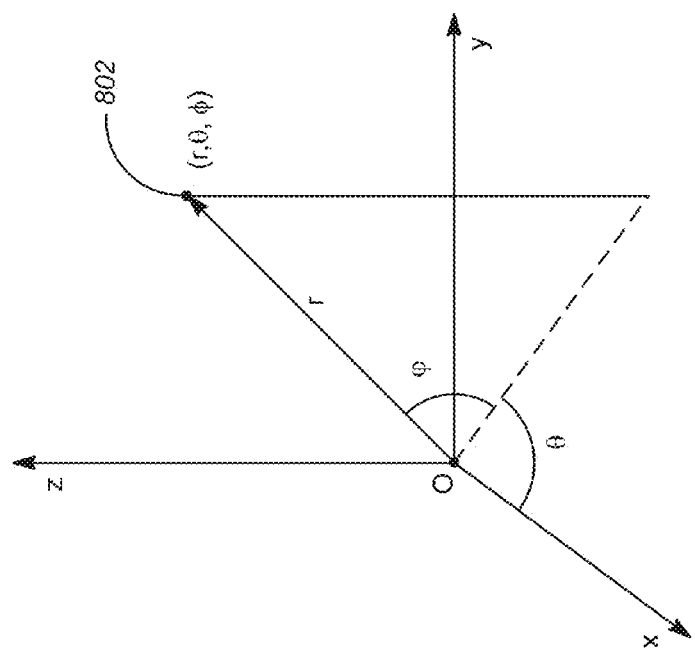
FIG. 8A
FIG. 8B

GENERATION OF THREE-DIMENSIONAL IMAGERY FROM A TWO-DIMENSIONAL IMAGE USING A DEPTH MAP

BACKGROUND

1. Field

This application relates generally to generating three-dimensional (3D) imagery, and more specifically, to processes and systems for generating 3D imagery from a two-dimensional (2D) image.

2. Related Art

Stereoscopic images are 2D images that create the illusion of 3D depth. Each stereoscopic image provides a view of a scene from a slightly different perspective. 3D depth is perceived when different images are displayed to a viewer in a way such that each eye sees a different view of the scene.

One way to produce 3D imagery of a live scene is to use a 3D camera, stereo camera, or the like, having two or more lenses each with a separate image sensor that captures an image of the scene from a slightly different perspective. FIG. 1 depicts an exemplary 3D camera 100 with two lenses 102 and 104. Similar to an observer's eyes, the lenses 102, 104 point in the same direction but are offset from one another to provide two different perspectives of the photographed scene.

It is also possible to create 3D images of a computer-generated environment. Computer-generated environments are typically created using geometric models of objects, characters, or other scene elements. The geometry data may include character rigs, animation curves, animation graphs, or the like. The geometric models may be combined with other animation data, such as textures, colors, lighting, and the like, in a rendering process to produce animated images of the computer-generated environment, such as the one shown in FIG. 2. Similar to live scenes, images of the computer-generated environment may be rendered from slightly different perspectives and displayed to provide the illusion of 3D depth.

Traditionally, producing realistic 3D imagery requires that the actual scene be imaged from at least two different perspectives. Thus, live or computer-generated scenes that were not originally imaged from multiple perspectives could not be used to produce quality 3D imagery of the scene. Furthermore, rendering a high-resolution image of a computer-generated environment containing many objects can require large amounts of computational resources (e.g., computer memory and processor time). The amount of required computational resources becomes an even greater issue when 3D imagery is desired since producing 3D imagery involves rendering the environment multiple times.

Thus, there is an opportunity to improve techniques for generating 3D imagery of real and computer-generated scenes.

SUMMARY

In one embodiment, a computer-implemented method for generating stereoscopic images includes obtaining image data, generating a mesh, mapping the image data to the mesh, generating a first image of the mesh from a first perspective, and generating a second image of the mesh from a second perspective. A direction, a color value, and a depth value are associated with each sample point. The directions and depth values are relative to a common origin. The mesh is displaced from the origin in the directions associated with the sample points by distances representative of the corresponding depth values. The color values associated with the sample points are mapped to the mesh at the corresponding directions.

In one embodiment, the first and second images are caused to be displayed. Displaying the first and second images may create an illusion of depth. In one embodiment, the first and second images are displayed on a head-mounted display.

In another embodiment, the image data is tessellated. Tessellating the image data creates a plurality of vertices that are used as the sample points for generating the mesh, mapping the image data to the mesh, and generating the first and second images of the mesh. The density of vertices may be greater than a density of pixels of a display to be used to display the first and second images.

In one embodiment, a portion of an image to be displayed is determined and image data is obtained only for the portion of the image. The portion of the image to be displayed is determined at least in part by the position of a head-mounted display.

In another embodiment, the image data represents an image of a scene from the perspective of a vantage point. The image data may represent a computer-generated image of the scene, or the scene may be a live scene. The image may include a 360 degree view horizontally around the vantage point and a 180 degree view vertically around the vantage point.

Systems and computer-readable storage media including instructions for generating stereoscopic images are also described.

BRIEF DESCRIPTION OF THE FIGURES

The present application may be best understood by reference to the following description taken in conjunction with the accompanying figures, in which like parts may be referred to by like numerals.

FIGS. 3A-3B illustrate an exemplary virtual reality headset.

FIG. 8A illustrates an exemplary reference frame for a mesh.

FIG. 8B illustrates an exemplary 3D mesh.

Figure 1:
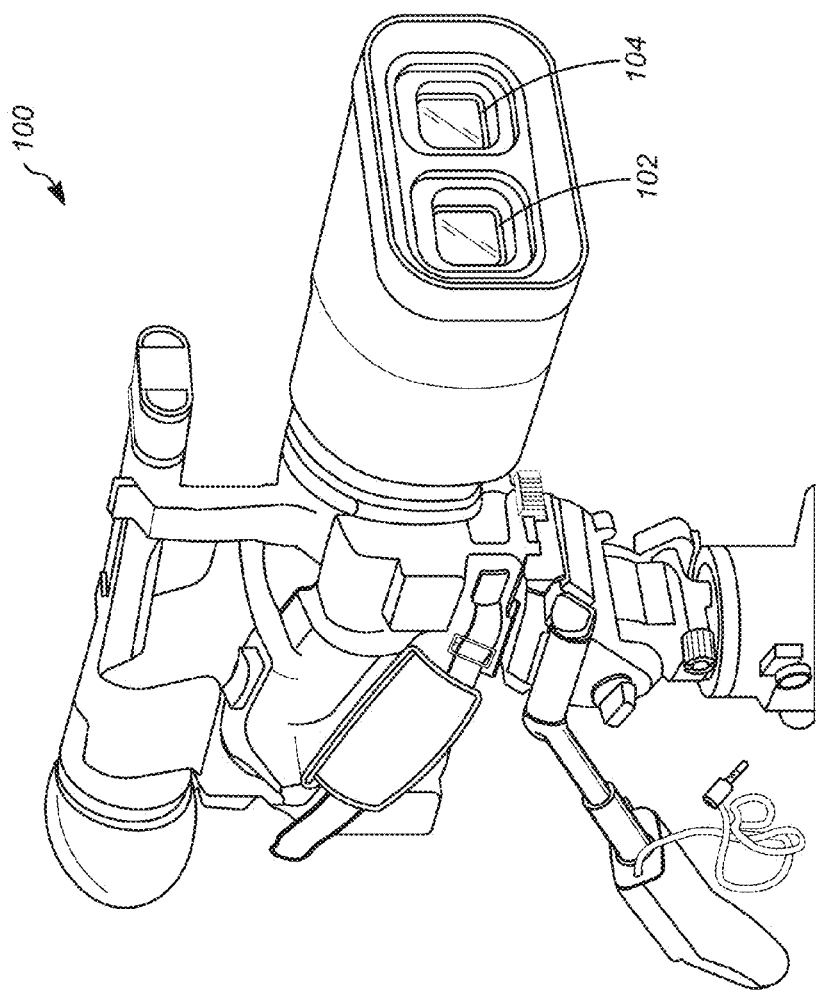
FIG. 1 illustrates an exemplary camera for capturing 3D images.
Figure 2:
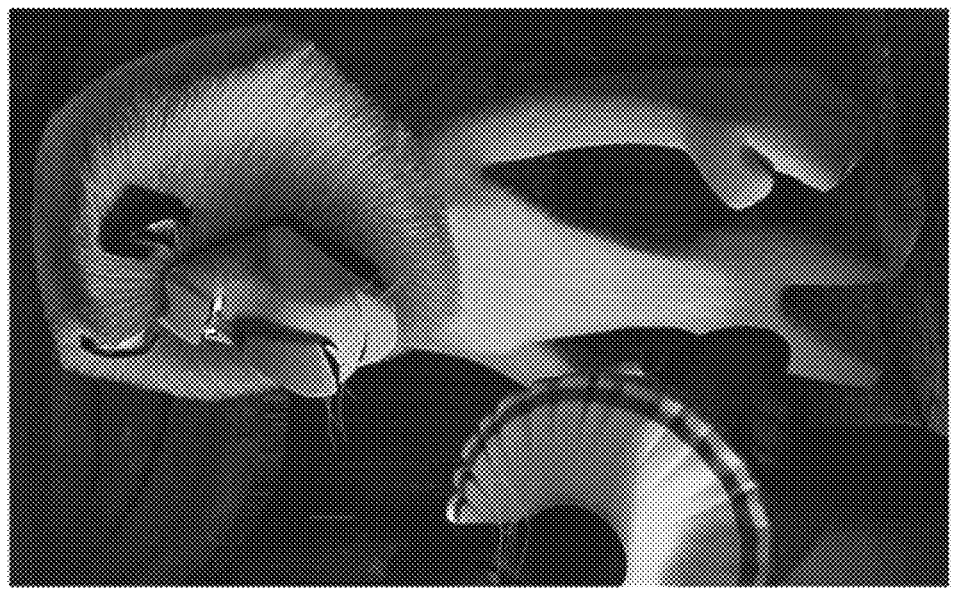
FIG. 2 illustrates an exemplary computer-generated image.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various examples are described below relating to processes for generating 3D imagery from a 2D image. The processes may allow for the perception of depth in a scene without having to capture or render true 3D imagery. In some embodiments, a 2D image of a scene is mapped to a 3D mesh that is generated using depth information associated with the image. The image mapped to the 3D mesh is re-imaged from two different perspectives to produce stereoscopic images that can be displayed to create the illusion of 3D depth. See also U.S. patent application Ser. No. 14/618,990, titled "Generation of Three-dimensional Imagery to Supplement Existing Content," filed Feb. 10, 2015, by Herman, which is incorporated by reference in its entirety for all purposes.

The stereoscopic images may be projected or displayed in any way that allows 3D depth to be perceived from 2D images. In some examples, the images are projected onto a screen and are overlapped for viewing through 3D glasses, as is done in theaters for example. In other examples, a head-mounted display, such as a virtual reality headset, may be used. The headset may include displays and optics that present a different image to each eye.

FIGS. 3A-3B depict an exemplary virtual reality headset 300 that may be used to display 3D imagery. The headset 300 includes a display/sensor portion 302 and straps 304 to secure the headset 300 to a user's head. The display/sensor portion 302 includes a display unit that generates a two-dimensional image for each eye. The images may be displayed by projecting the image onto a miniaturized screen in the headset 300. In some embodiments, the display unit includes a CRT, LEDs, LCDs, or the like. Optics may be used to manipulate and condition the light from the display. As seen in FIG. 3B, for example, the headset 300 includes binocular optics 306 for viewing the display.

The headset 300 may also include a motion-sensing unit that includes sensors, such as, for example, gyroscopes, accelerometers, cameras, or the like, to detect and track movement of the user's head. As a user's head physically moves, the motion sensors in headset 300 may detect the movement and alter the user's view. For example, when a user turns his head to the right, the headset displays an image to the right of the previous view. Accordingly, the user may "look around" simply by moving his head the same way as he would look around the real world.

Figure 4:
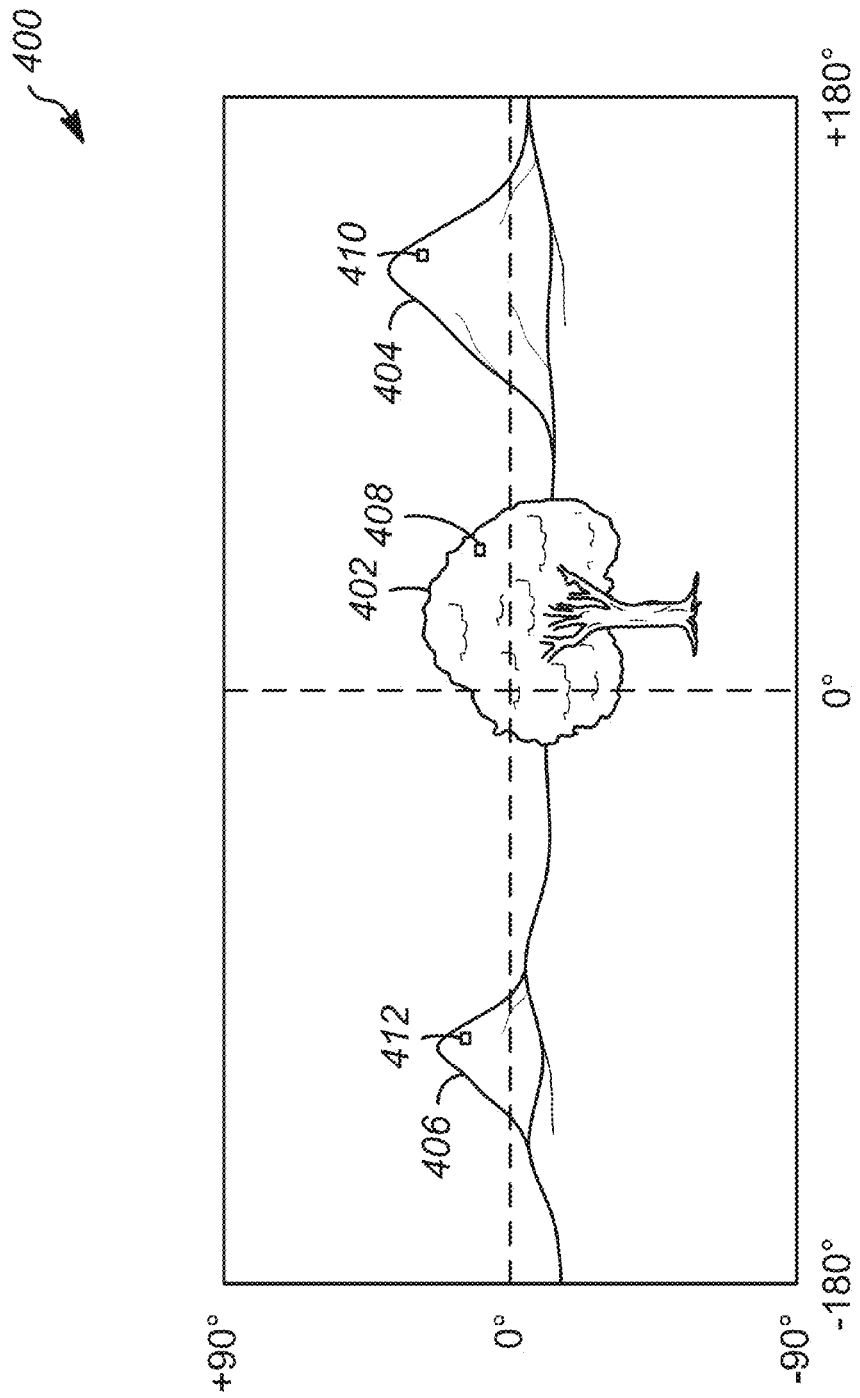
FIG. 4 illustrates an exemplary 2D image of a scene.

FIG. 4 depicts an exemplary 2D image 400 of a scene. The scene may be a real environment that includes a tree 402 and two hills 404 and 406. The image 400 shows a 360 degree horizontal by 180 degree vertical (360×180) view around a vantage point. A 360×180 image of a live scene may be captured using six 90 degree field-of-view cameras oriented in a cube configuration (i.e., one camera facing perpendicularly away from each face of the cube). However, it should be appreciated that various other camera and lens configurations may be used to capture the image.

In other examples, the image may be completely computer-generated or may include both real and computer-generated content. Also, while the example provided in FIG. 4 describes a full 360×180 view of a scene, it should be appreciated that the image may include a view of only a portion of the scene surrounding a vantage point.

The image may be represented by image data containing a plurality of sample points or pixels (e.g., a digital image). Each pixel may be associated with a color value (e.g., in RGB format) and a direction relative to the location from which the image was captured or rendered. Color values may also include grey-scale values.

Each pixel is also associated with a depth value. The depth value represents a distance from the vantage point to the portion of the scene at the pixel. For example, in FIG. 4, pixel 408 on the tree is located approximately 30 degrees in the horizontal direction, approximately 15 degrees in the vertical direction, and has a depth value of 10. Pixel 410 on the hill on the right side of the image is located approximately 110 degrees in the horizontal direction, approximately 35 degrees in the vertical direction, and has a depth value of 20. Pixel 412 on the hill on the left side of the image is located approximately −100 degrees in the horizontal direction, approximately 20 degrees in the vertical direction, and has a depth value of 50.

The depth values may be generated in various ways. For an image of a live scene, a depth camera may be used to measure the depths of objects while capturing images of the scene (i.e., the distance from the camera to an object or a point on an object). Depth data may also be generated after the image has been captured. For example, an algorithm may be used to estimate the depths of objects in the scene based on the field-of-view of the image, the size of objects relative to an object of known size, or other factors. Alternatively, depth values may be assigned manually. Depth values may also be altered from their measured or estimated values for artistic reasons, to create, emphasize, or minimize certain effects.

For computer-generated images, depth values may be determined directly from the 3D computerized model from which the image is rendered. Alternatively, depth values may be assigned manually or using an algorithm as discussed above with regard to live scenes.

Figure 5:
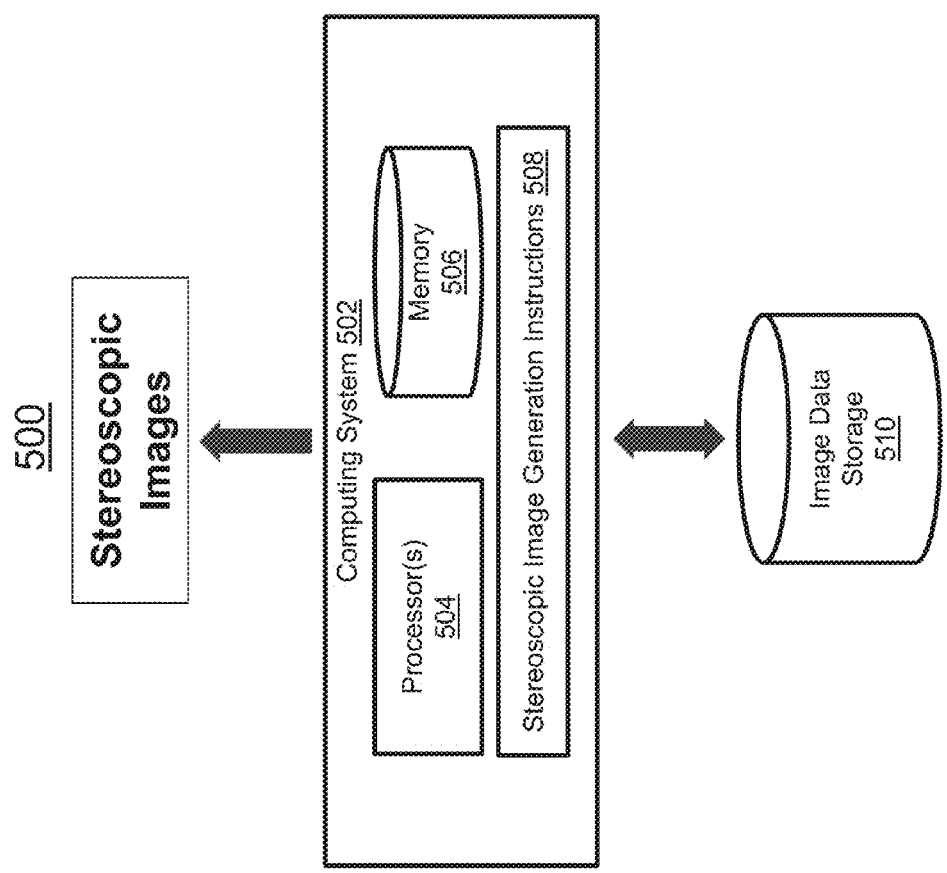
FIG. 5 illustrates an exemplary stereoscopic image generation system.

FIG. 5 illustrates an exemplary stereoscopic image generation system 500 that may be used to create stereoscopic images of a scene similar to that of FIG. 4. Stereoscopic image generation system 500 may be implemented using computing system 502 having one or more processors 504 for executing stereoscopic image generation instructions 508 stored on a non-transitory computer-readable storage medium of computing system 502. Computing system 502 may further include memory 506 for storing image data from image data storage 510. The image data may include previously captured images or video. The images may be of a live scene or a rendered computer-generated scene. Memory 506 may also be configured to store data created while executing stereoscopic image generation instructions 508. As discussed in greater detail below, stereoscopic image generation system 500 may be used to create stereoscopic images to create the illusion of depth from a 2D image.

While image data storage 510 is shown as being a separate database that is separate from computing system 502, it should be appreciated that image data storage 510 may instead be implemented using a single storage device that is local or remote to computing system 502.

Figure 6:
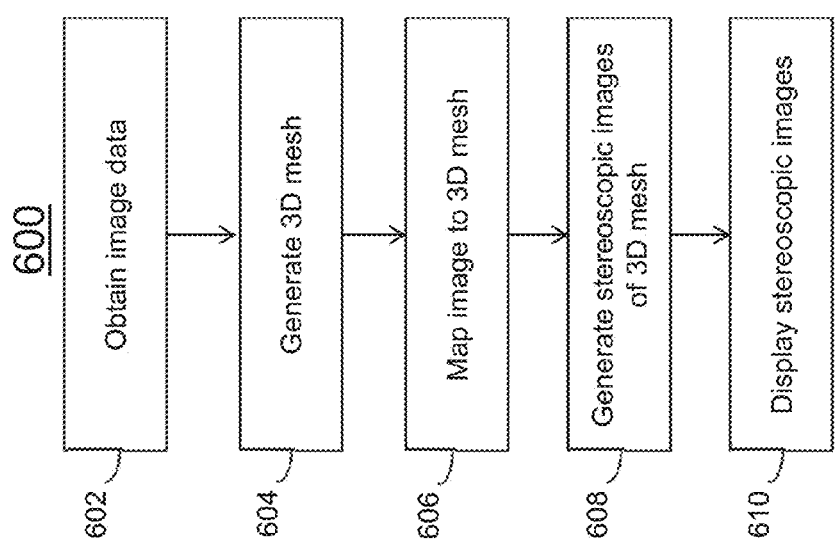
FIG. 6 illustrates an exemplary process for generating stereoscopic images.

FIG. 6 illustrates an exemplary process 600 for creating stereoscopic images from a 2D image, such as image 400 discussed above with respect to FIG. 4. While specific steps and operations of process 600 are discussed in a particular order, it should be recognized that the processes described below are merely exemplary and do not exclude the possibility of performing additional steps, performing a subset of the described steps (or portions thereof), or performing the described steps in an alternative order.

Figure 7:
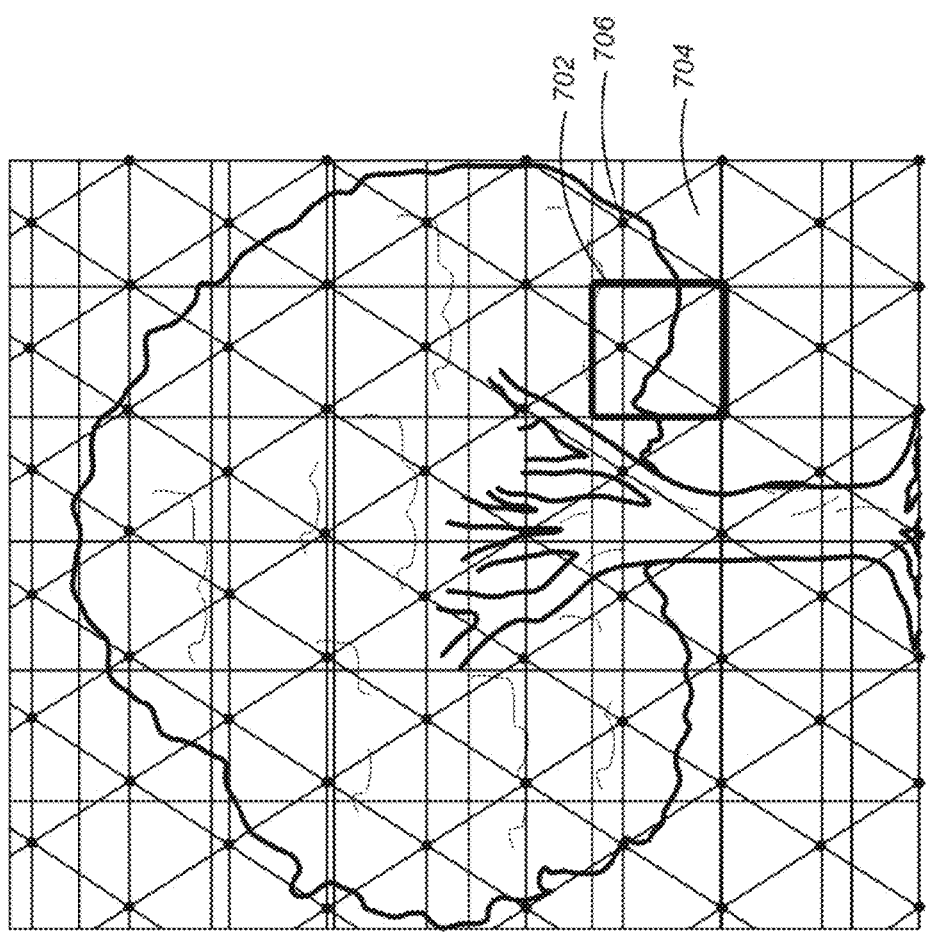
FIG. 7 illustrates an exemplary portion of a tessellated image.

At block 602, image data is obtained. The image data may include a digital image with a direction, color value, and depth value associated with each pixel in the image. Optionally, the image data is tessellated. Tessellation divides the image into smaller regions (typically polygons) defined by line segments that meet at vertices. FIG. 7 depicts an exemplary portion of the image 400 from FIG. 4 that has been tessellated. In FIG. 7, the portion of image 400 is represented by square pixels identified by the dashed lines. Exemplary pixel 702 is outlined in bold. The image has been tessellated into triangles 704 defined by vertices 706. In some examples, it may be advantageous to tessellate the image such that the vertices form regions (e.g., polygons) of equal area when projected onto a sphere in their corresponding directions.

The direction, color, and depth values associated with a vertex may be interpolated from the values of the pixels surrounding the vertex. Tessellation may be performed to increase the sampling of the image beyond the resolution of the display that will be used to display the 3D imagery. For example, the image may be tessellated until the density of vertices is greater than the pixel density of the display (i.e., the number of vertices exceeds the number of pixels in the display). In some examples, it may be possible to use the existing pixels as the vertices if, for example, the resolution of the obtained image is already greater than the resolution of the display.

Returning to FIG. 6, at block 604, a 3D mesh is generated. The mesh is generated by displacing the vertices of the image from a common origin. Each vertex is displaced in its associated direction by a distance representative of its depth value. FIG. 8A depicts an exemplary reference frame for a mesh. Vertex 802 is displaced in the direction defined by the coordinates θ in the horizontal direction and φ in the vertical direction. The vertex 802 is displaced from the origin O by the distance r, which is representative of the depth value assigned to the vertex 802. The displaced vertices create a mesh that represents a 3D scan around the vantage point from which the scene was imaged. FIG. 8B depicts an exemplary 3D mesh 810 with varying depth values that surrounds an origin O.

Figure 9:
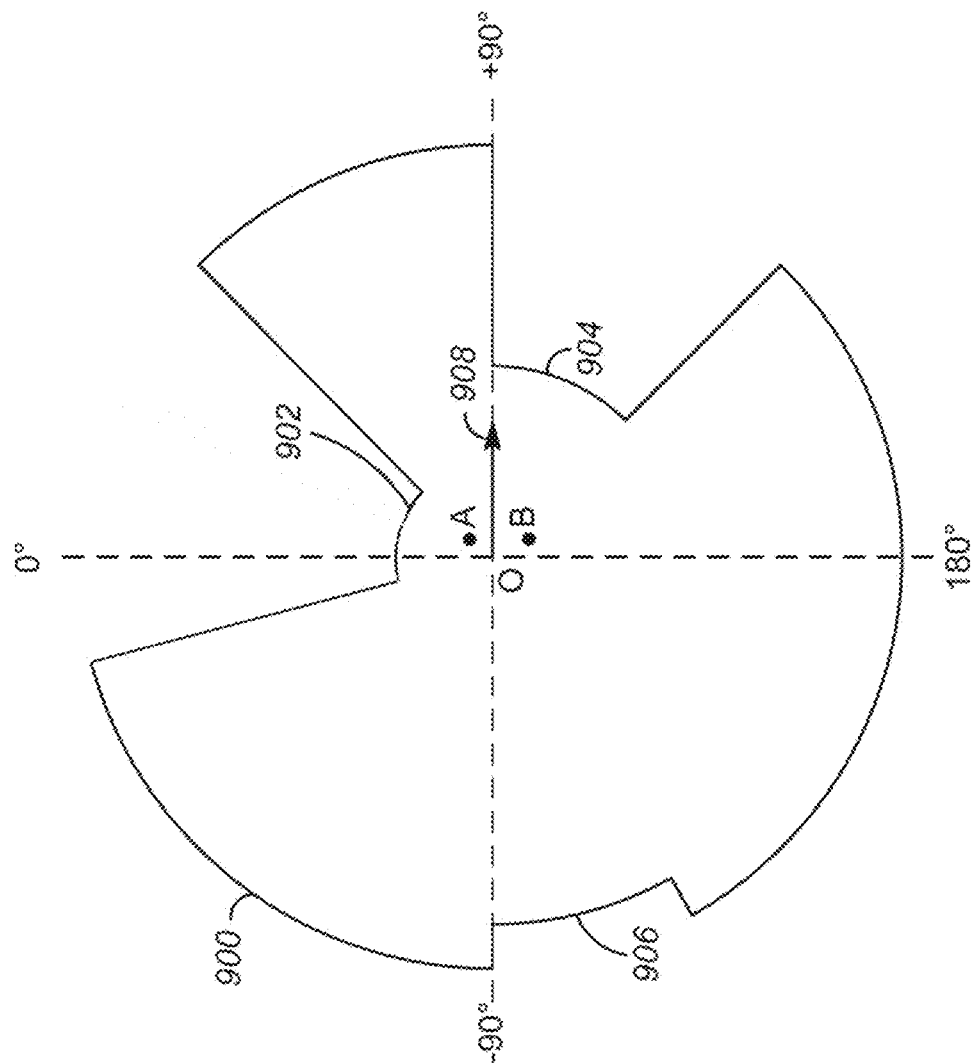
FIG. 9 illustrates an exemplary cross-section of a 3D mesh.

FIG. 9 depicts an exemplary cross-section of a mesh 900 corresponding to image 400 in FIG. 4. FIG. 9 shows a horizontal cross-section of the mesh 900 at zero degrees in the vertical direction. As shown, the distance of the mesh from the origin O varies with direction around the horizon. Features in the scene with smaller depth values are closer to the origin, while features with larger depth values are farther away. Portion 902 of the horizontal cross-section corresponds to the location of the tree 402 in image 400, and is therefore relatively close to the origin O. Portions 904 and 906 correspond to the locations of the hills 404 and 406, respectively, and therefore are farther away.

Returning again to FIG. 6, at block 606, the image is mapped onto the mesh. The color value associated with each vertex is mapped to the mesh such that the image is shown on the mesh. The colors of the regions between vertices may be determined using the colors associated with the vertices that surround the portion (e.g., by using a weighted average).

At block 608, stereoscopic images of the mesh are generated. The images are generated from at least two different perspectives to produce 2D stereoscopic images of the mapped image. Imaging the mesh may also be referred to as re-imaging the original image. The stereoscopic images may be generated from the perspectives of locations near the origin such that the images provide a view of the inner surface of the mesh. The locations from which the mesh is imaged will be discussed in greater detail below.

At block 610, the stereoscopic images of the mesh are displayed. When viewed together, the stereoscopic images of the mapped mesh create the illusion of depth in the scene shown in the original image. Any method of displaying stereoscopic images to provide the illusion of depth may be used. The display may show the entire images generated at block 608 or portions thereof. For example, only a portion of the generated images may be displayed if the angular extent of the generated images exceeds the field of view of the display.

The locations from which the mesh is imaged at block 608 may be based on the perspective of the image that is to be displayed at block 610. The locations may be chosen to simulate the views that would be observed by a person located at the vantage point from which the original image was captured. In some examples, the locations from which the mesh is imaged represent the positions of a viewer's left and right eyes based on the look direction and orientation of the viewer's head.

For example, an image of the mesh may be captured from the perspectives of each of two points adjacent to and approximately equal distance from the origin. In FIG. 9, for example, a first image is generated from the perspective of point A, and a second image is generated from the perspective of point B. Points A and B may be used when the portion of the image at 90 degrees along the horizontal direction is centered on the display and to simulate a user looking in the direction identified by arrow 908.

In some examples, process 600 is applied to only the portion of the image to be displayed. The portion of the image to be displayed may be determined and then the data corresponding to the determined portion is used as the image data in process 600. Performing process 600 on only the portion to be displayed may reduce the computational demands of the process.

For example, the field of view of a display (e.g., a projector or head-mounted display) may be limited such that only a portion of the scene can be displayed at any given time. In applications using a virtual reality headset that can detect the position and motion of a user's head, the displayed portion may be determined by the position of the virtual reality headset, which represents the position of the user's head. The view displayed to the user is determined at least in part by the direction in which the user is looking and the orientation of the user's head. In this situation, only the portion of the image in the field of view of the display in the direction the user is looking will be processed.

It should also be recognized that the images of the mesh are not true images of the live or computer-generated scene shown in the original image. Instead, they are images of a 3D representation of the scene. Accordingly, various aspects of the original image, generated mesh, stereoscopic images, and/or the steps in process 600 may be adjusted to make the displayed imagery more visually appealing, natural, and/or realistic. The images and mesh can be generated by use of data extrapolation from source content or from operator decisions. These decisions can be made in a virtual reality environment by a process similar to painting color and moving the depth around similar to a sculptor. For example, the depth values can be tuned from an accurate linear representation of object scale to a nonlinear representation in order to implement creative choices. In some examples, the thicknesses of objects can be adjusted to draw the viewer's eyes to or away from points of interest. The overall depth of the scene can be balanced for comfortable stereo viewing and to enhance the dramatic effect of the 3D imagery. For example tree 402 in FIG. 4 could be made very thick and detailed, while hills 404 and 406 are made to be thin and distant. This may draw the viewer's eye to tree 402 as the focus point.

The processes described above may be used to provide the illusion of depth from a 2D image by adding direction and depth data. This may be useful when 3D imagery is desired but means for capturing or generating stereoscopic images (e.g., a 3D camera for live images or an underlying 3D model for computer-generated images) of a scene is not available. The processes may also be useful for adding the illusion of depth to content that was not captured or rendered for 3D display. Also, the processes described herein may allow the perceived depth of objects in a scene to be modified after an image is shot simply by altering the depth values associated with the image.

Furthermore, while the process 600 is described above with respect to a single image, it should be appreciated that the process may be applied to a sequence of images, such as the frames of a video, motion picture, animation, or the like. In this case, process 600 is performed on the frame (or portion thereof) corresponding to the time at which the frame is displayed.

In some embodiments, the origin and/or orientation (i.e., frame of reference) of the mesh may be determined based on the location and orientation of the camera used to capture the image of the scene. The camera may be real, in the case of a live image, or virtual, in the case of a computer-generated image. The camera may move as images of a scene are being captured. In a movie, for example, a camera may scan to stay centered on the action in a scene. As another example, in a first-person virtual reality experience, the perspective of the virtual camera (e.g., location and/or orientation) may change to create the impression that the viewer is being moved or re-oriented in the virtual environment. The camera data may then be used to keep the mesh aligned with the direction of the camera so that the portion of the scene in front of the camera is also displayed in front of the user. This may be done by using the camera data to determine the directions associated with the pixels in each image. Also, as the camera moves, depth values change as a result of the changing relative distance of scene objects from the camera. In other words, the mesh may be rotated and/or deformed over time to reflect the change in position (i.e., location and/or orientation) of the camera.

The processes described herein may also increase the rate at which computer-generated 3D imagery can be generated. Rendering a single high-resolution image of a moderately complex computer-generated scene, for example, can potentially take hours of processor time. Process 600 may allow the time-consuming high-resolution rendering to be performed in advance and then used later to quickly produce high-resolution, stereoscopic images from the rendered image.

Being able to generate the stereoscopic images rapidly may be beneficial for virtual reality applications. In many virtual reality applications, only a portion of a virtual environment is displayed to a user at any particular time. The user may be able to change the displayed perspective of the virtual environment at any time via an input to a control device such as a joystick or controller. Alternatively, as described above, a virtual reality headset may include motion/position sensors that allow a user to change the displayed perspective of the virtual environment by looking around in different directions. As the perspective is changed, the system determines the portion of the scene viewable by the user and then tessellates the corresponding portion of the image, generates a mesh for the portion, maps the portion of the image to the mesh, and images the viewable portion of the mesh. The ability to rapidly produce 3D images may allow for a reduction in the delay associated with updating the display in response to the user's actions. Slow display update rates may cause the displayed image to appear fuzzy, which may be distracting to the viewer and could potentially cause or worsen the effects of motion sickness.

In some examples, the processes described above are applied to only certain objects in a scene. Stereoscopic images of a stationary background may be generated according to the techniques described above and combined with a full 3D rendering of a computer-generated character or object. This may allow for the real-time generation of 3D video at resolutions greater than would be possible if the entire scene were rendered for each frame.

As mentioned above, rendering an image of a scene may be very time consuming. However, it may be possible to perform process 600 on an image (or a portion thereof) in a relatively short amount of time. To make producing real-time video feasible, certain portions of a video or animation (e.g., portions that do not change rapidly) may be pre-rendered. Process 600 may then be applied to the pre-rendered portions to generate frames in real-time.

For example, a virtual reality experience may include the ability to interact with a virtual character that moves in response to user inputs. Both modeling of the character's motion and rendering of the character can be performed in real-time so that the user and the character can respond quickly to each other's actions. However, in some examples, rendering images of the environment (e.g., background, surrounding objects, etc.) in real-time may not be possible due to the amount of computation required for rendering, but modeling and rendering just the character is feasible. Thus, it may be possible to produce full high-resolution 3D imagery of a scene, including an interactive character, in real-time by pre-rendering the environment (or a portion thereof) and then, at each frame, generating stereoscopic images of the environment using process 600 while rendering updated 3D imagery of the character. The images of the character can then be layered on top of the environment for display. Separate video or display channels may be used to layer the background and character imagery.

In another example of a virtual reality experience that includes the ability to interact with a virtual character, the character and the environment are rendered in separate processing layers. Each layer produces full, high-resolution imagery of its designated portion of the scene (e.g., character or environment). The layers are updated independently from each other allowing for different update schedules. For example, the character may require faster updates than the environment. At each frame, the data produced by the layers is merged and then used to generate stereoscopic images of the merged dataset using process 600.

Figure 10:
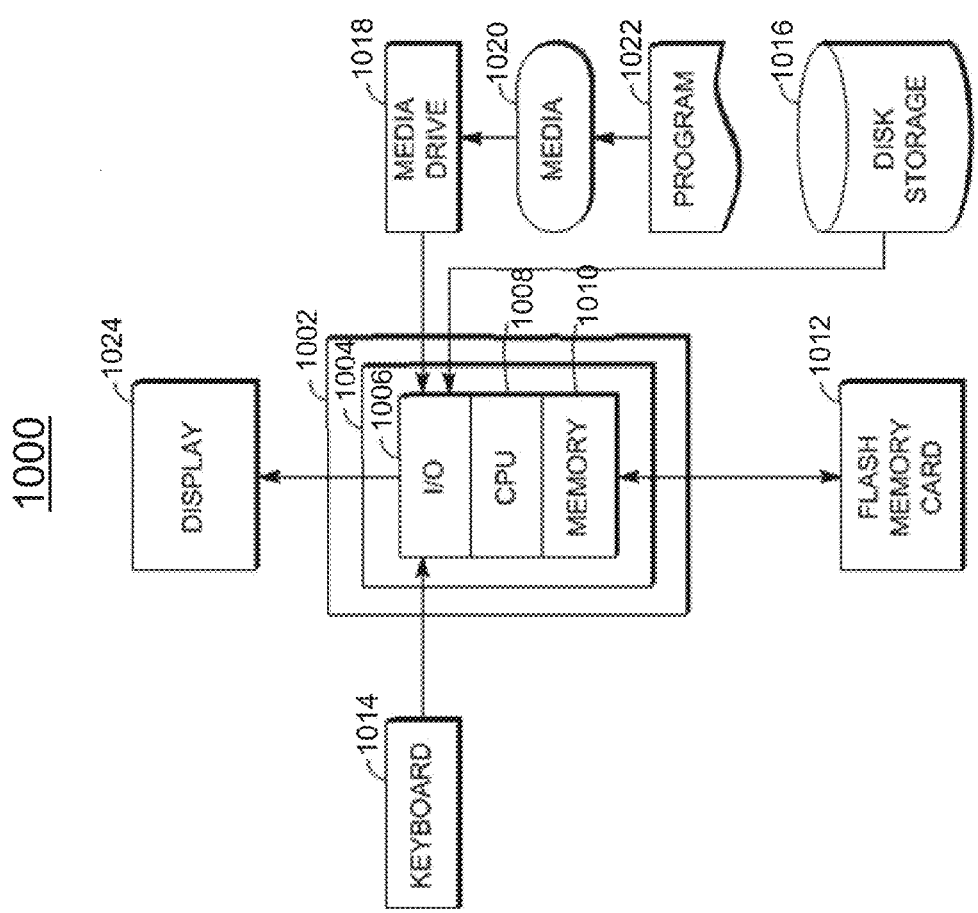
FIG. 10 illustrates an exemplary computing system.

Turning now to FIG. 10, components of an exemplary computing system 1000, configured to perform any of the above-described processes and/or operations are depicted. For example, computing system 1000 may be used to implement computing system 502 and to perform process 600. Computing system 1000 may include, for example, a processor, memory, storage, and input/output devices (e.g., monitor, keyboard, stylus, drawing device, disk drive, Internet connection, etc.). However, computing system 1000 may include circuitry or other specialized hardware for carrying out some or all aspects of the processes. In some operational settings, computing system 1000 may be configured as a system that includes one or more units, each of which is configured to carry out some aspects of the processes either in software, hardware, or some combination thereof.

In computing system 1000, the main system 1002 may include a motherboard 1004 with a bus that connects an input/output (I/O) section 1006, one or more central processing units (CPU) 1008, and a memory section 1010, which may have a flash memory card 1012 related to it. Memory section 1010 may contain computer-executable instructions and/or data for carrying out process 600. The I/O section 1006 may be connected to display 1024, a keyboard 1014, a disk storage unit 1016, and a media drive unit 1018. The media drive unit 1018 can read/write a non-transitory computer-readable storage medium 1020, which can contain programs 1022 and/or data.

Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for generating stereoscopic images, the method comprising:
   obtaining image data comprising a plurality of sample points,
     wherein a direction, a color value, and a depth value are associated with each sample point, and
     wherein the directions and depth values are relative to a common origin of a spherical coordinate system;
   generating a mesh, wherein the mesh is displaced from the common origin of the spherical coordinate system in the directions associated with the sample points by distances representative of the corresponding depth values;
   mapping the image data to the mesh, wherein the color values associated with the sample points are mapped to the mesh at the corresponding directions;
   generating a first image of the mesh from a first perspective; and
   generating a second image of the mesh from a second perspective.

2. The computer-implemented method of claim 1, further comprising causing a display of at least a portion of the first image and at least a portion of the second image.

3. The computer-implemented method of claim 2, wherein the display of the first and second images creates an illusion of depth.

4. The computer-implemented method of claim 2, wherein the first and second images are displayed on a head-mounted display.

5. The computer-implemented method of claim 1, further comprising tessellating the image data, wherein tessellating the image data creates a plurality of vertices, and wherein the vertices are used as the sample points for generating the mesh, mapping the image data to the mesh, and generating the first and second images of the mesh.

6. The computer-implemented method of claim 5, wherein the density of vertices is greater than a density of pixels of a display to be used to display the first and second images.

7. The computer-implemented method of claim 1, further comprising:
   determining a portion of an image to be displayed, wherein image data is obtained only for the portion of the image.

8. The computer-implemented method of claim 7, wherein the portion of the image to be displayed is determined at least in part by the position of a head-mounted display.

9. The computer-implemented method of claim 1, wherein the image data represents an image of a scene from the perspective of a vantage point.

10. The computer-implemented method of claim 9, wherein the scene is computer-generated.

11. The computer-implemented method of claim 9, wherein the scene is a live scene.

12. The computer-implemented method of claim 9, wherein the image includes a 360 degree view horizontally around the vantage point and a 180 degree view vertically around the vantage point.

13. A non-transitory computer-readable storage medium for generating stereoscopic images, the non-transitory computer-readable storage medium comprising computer-executable instructions for:
   obtaining image data comprising a plurality of sample points,
     wherein a direction, a color value, and a depth value are associated with each sample point, and
     wherein the directions and depth values are relative to a common origin of a spherical coordinate system;
   generating a mesh, wherein the mesh is displaced from the common origin of the spherical coordinate system in the directions associated with the sample points by distances representative of the corresponding depth values;
   mapping the image data to the mesh, wherein the color values associated with the sample points are mapped to the mesh at the corresponding directions;
   generating a first image of the mesh from a first perspective; and
   generating a second image of the mesh from a second perspective.

14. The non-transitory computer-readable storage medium of claim 13, further comprising computer-executable instructions for causing a display of the first and second images.

15. The non-transitory computer-readable storage medium of claim 14, wherein the display of the first and second images creates an illusion of depth.

16. The non-transitory computer-readable storage medium of claim 14, wherein the first and second images are displayed on a head-mounted display.

17. The non-transitory computer-readable storage medium of claim 13, further comprising computer-executable instructions for tessellating the image data, wherein tessellating the image data creates a plurality of vertices, and wherein the vertices are used as the sample points for generating the mesh, mapping the image data to the mesh, and generating the first and second images of the mesh.

18. The non-transitory computer-readable storage medium of claim 17, wherein the density of vertices is greater than a density of pixels of a display to be used to display the first and second images.

19. The non-transitory computer-readable storage medium of claim 13, further comprising computer-executable instructions for determining a portion of an image to be displayed, wherein image data is obtained only for the portion of the image.

20. The non-transitory computer-readable storage medium of claim 19, wherein the portion of the image to be displayed is determined at least in part by the position of a head-mounted display.

21. The non-transitory computer-readable storage medium of claim 13, wherein the image data represents an image of a scene from the perspective of a vantage point.

22. The non-transitory computer-readable storage medium of claim 21, wherein the image data represents a computer-generated image of the scene.

23. The non-transitory computer-readable storage medium of claim 21, wherein the scene is a live scene.

24. The non-transitory computer-readable storage medium of claim 21, wherein the image includes a 360 degree view horizontally around the vantage point and a 180 degree view vertically around the vantage point.

25. A system for generating stereoscopic images, the system comprising:
a display; and
one or more processors coupled to the display and configured to:
obtain image data comprising a plurality of sample points,
wherein a direction, a color value, and a depth value are associated with each sample point, and
wherein the directions and depth values are relative to a common origin of a spherical coordinate system;
generate a mesh, wherein the mesh is displaced from the common origin of the spherical coordinate system in the directions associated with the sample points by distances representative of the corresponding depth values;
map the image data to the mesh, wherein the color values associated with the sample points are mapped to the mesh at the corresponding directions;
generate a first image of the mesh from a first perspective;
generate a second image of the mesh from a second perspective; and
cause a display of the first and second images using the display.

26. The system of claim 25, wherein the display of the first and second images creates an illusion of depth.

27. The system of claim 25, wherein the one or more processors is further configured to tessellate the image data, wherein tessellating the image data creates a plurality of vertices, and wherein the vertices are used as the sample points for generating the mesh, mapping the image data to the mesh, and generating the first and second images of the mesh.

28. The system of claim 27, wherein the display includes a plurality of pixels, and wherein the density of vertices is greater than a density of pixels of the display.

29. The system of claim 25, wherein the one or more processors is further configured to determine a portion of an image to be displayed, wherein image data is obtained only for the portion of the image.

30. The system of claim 29, wherein the display is a head-mounted display, and wherein the portion of the image to be displayed is determined at least in part by the position of the head-mounted display.

31. The system of claim 25, wherein the image data represents an image of a scene from the perspective of a vantage point.

32. The system of claim 31, wherein the image data represents a computer-generated image of the scene.

33. The system of claim 31, wherein the scene is a live scene.

34. The system of claim 31, wherein the image includes a 360 degree view horizontally around the vantage point and a 180 degree view vertically around the vantage point.

* * * * *